US 8,284,656 B2

(12) United States Patent
Saha et al.

(10) Patent No.: US 8,284,656 B2
(45) Date of Patent: Oct. 9, 2012

(54) SYSTEM AND METHOD FOR RESILIENT VPLS OVER MULTI-NODAL APS PROTECTED PROVIDER EDGE NODES

(75) Inventors: Kajal Saha, Ottawa (CA); Johan van Besouw, Surry Hills (AU); Joe Regan, Pleasanton, CA (US)

(73) Assignee: Alcatel Lucent, Paris (FR)

(*) Notice: Subject to any disclaimer, the term of this patent is extended or adjusted under 35 U.S.C. 154(b) by 1349 days.

(21) Appl. No.: 11/443,101

(22) Filed: May 31, 2006

(65) Prior Publication Data
US 2007/0253326 A1  Nov. 1, 2007

Related U.S. Application Data

(60) Provisional application No. 60/795,586, filed on Apr. 28, 2006.

(51) Int. Cl.
*H04L 12/26* (2006.01)
(52) U.S. Cl. .......................... 370/219; 370/216
(58) Field of Classification Search .................. 370/395, 370/219, 216, 328, 221, 242, 392, 225, 401, 370/223, 256; 709/200, 238; 714/4, 13
See application file for complete search history.

(56) References Cited

U.S. PATENT DOCUMENTS

| | | | | |
|---|---|---|---|---|
| 6,330,229 B1 * | 12/2001 | Jain et al. | ...................... | 370/256 |
| 6,662,308 B1 * | 12/2003 | Baroni et al. | ...................... | 714/4 |
| 7,152,179 B1 * | 12/2006 | Critchfield | ...................... | 714/4.11 |
| 7,269,132 B1 * | 9/2007 | Casey et al. | ...................... | 370/219 |
| 7,345,991 B1 * | 3/2008 | Shabtay et al. | ...................... | 370/221 |
| 2004/0064581 A1 * | 4/2004 | Shitama et al. | ...................... | 709/238 |
| 2004/0133619 A1 * | 7/2004 | Zelig et al. | ...................... | 709/200 |
| 2004/0174887 A1 * | 9/2004 | Lee | ...................... | 370/395.53 |
| 2005/0243713 A1 * | 11/2005 | Okuda | ...................... | 370/216 |
| 2005/0265346 A1 * | 12/2005 | Ho et al. | ...................... | 370/392 |
| 2006/0020854 A1 * | 1/2006 | Cardona et al. | ...................... | 714/13 |
| 2006/0203735 A1 * | 9/2006 | Takatori et al. | ...................... | 370/242 |
| 2006/0245351 A1 * | 11/2006 | Pande et al. | ...................... | 370/216 |
| 2007/0008982 A1 * | 1/2007 | Voit et al. | ...................... | 370/401 |
| 2007/0104126 A1 * | 5/2007 | Calhoun et al. | ...................... | 370/328 |
| 2008/0285440 A1 * | 11/2008 | Adler | ...................... | 370/223 |
| 2009/0296568 A1 * | 12/2009 | Kitada | ...................... | 370/221 |

* cited by examiner

*Primary Examiner* — Andrew Lai
*Assistant Examiner* — Syed M Bokhari
(74) *Attorney, Agent, or Firm* — Kramer & Amado PC

(57) ABSTRACT

A system and method for multi-nodal APS (MN-APS) protection switching for a virtual private LAN service (VPLS) using a redundant pair of PE (provider edge) nodes is provided. In the event of an APS switchover, the previously active node of the redundant pair sends explicit requests to the other provider edge nodes to flush their MAC address entries that they had previously learned through the previously active node, facilitating quicker re-convergence and reduction of black-holing.

20 Claims, 3 Drawing Sheets

SYSTEM AND METHOD FOR RESILIENT VPLS OVER MULTI-NODAL APS PROTECTED PROVIDER EDGE NODES

CROSS-REFERENCE TO RELATED APPLICATIONS

This application claims the benefit of U.S. Provisional Application No. 60/795,586, filed Apr. 28, 2006.

FIELD OF THE INVENTION

The invention relates to automatic protection switching (APS) in a communications network and more particularly to a system and method for a multi-nodal APS (MN-APS) redundant pair of PE (provider edge) nodes for a virtual private LAN service (VPLS).

BACKGROUND OF THE INVENTION

Service providers often deliver VLAN services to enable customers to set up a virtual LAN over the service provider's network fabric. The VPLS allows the connection of multiple customer premises equipment sites (CPEs) in a single bridged domain over a provider-managed IP/MPLS (multi-protocol layer switching) network. VPLS is a transparent, protocol-independent service, in which the CPEs in a VPLS instance appear to be on the same LAN regardless of their actual location. CPEs are connected to the IP/MPLS network through an access cloud, which is whatever communications fabric which lies between the CPEs and the edge of the IP/MPLS network. At the edge of the IP/MPLS network are provider edge nodes which form a major part in delivery of VPLS. In order to provide redundancy and protection from link failure, protection switching between the access cloud and the provider edge nodes is often employed. Single and multi-chassis APS (automatic protection switching) may be employed to help ensure delivery of service between the access cloud and provider edge nodes. Known methods of APS may be applied to VPLS to minimize traffic interruption and attempt to help VPLS reconvergence.

Referring now to FIG. 1, known delivery of VPLS is described.

In FIG. 1 first customer premises equipment 210 and second customer premises equipment (CPE2) 220 are connected to an access cloud 200 which lies outside of the VPLS core IP/MPLS network 400 of the service provider. Access cloud 200 has an access switch 202. The access cloud 200 and switch 202 may for example be ATM/SONET/SDH/frame relay, as long as access to the VLAN provider edge nodes of the VPLS service is provided. The access switch 202 is linked to a first provider edge node (PE1) 300 via an access link 280. Link 280 may be a single circuit or may be an APS 1+1 redundant pair in a multiport single node arrangement for example. The first provider edge node 300 of the VLAN is linked through the VPLS core network 400 to other provider edge nodes through tunnels. A first tunnel 290 links the first provider edge node 300 to a second provider edge node (PE2) 310. The second provider edge node 310 is linked via a second tunnel 292 to a third provider edge node (PE3) 320. The first provider edge node 300 and the third provider edge node 320 are linked by a third tunnel 294. Fourth customer premises equipment (CPE4) 250 and fifth customer premises equipment (CPE5) 260 are linked to the third provider edge node 320 and third customer premises equipment (CPE3) 240 is linked to the second provider edge node 310.

In the VPLS core 400, each provider edge node 300, 310, 320, possesses a MAC address table having MAC address entries which provide information used by the provider edge node 300, 310, 320 to link with each customer premises equipment 210, 220, 240, 250, 260. Each MAC address entry in the MAC address table of a particular provider edge node contains the MAC address of a customer premises equipment and a MAC address mapping value which designates the link to the CPE. When the customer premises equipment is remote from the particular provider edge node and accesses the VLAN through a different provider edge node, the MAC address mapping value designates the tunnel linking the particular provider edge node with the different provider edge node. Provider edge nodes learn MAC address mapping values with the customer traffic sent through access ports and over the IP/MPLS network. Customer traffic from an originating provider edge node having a destination customer premises equipment which has an unmapped MAC address at the originating provider edge node is broadcast to all other provider edge nodes 300, 310, 320 participating in delivery of the VPLS. The MAC address mapping value designating the tunnel which allows VPLS delivery to the destination customer premises equipment is learned by the originating provider edge node from a reply from the destination customer premises equipment, after which customer traffic is sent unicast towards the destination customer premises equipment with use of the MAC address mapping value. The MAC address mapping value of a MAC address entry corresponding to a customer premises equipment can also be learned by a provider edge node by receiving customer traffic from that customer premises equipment.

For example, if first customer premises equipment 210 were to try to access third customer premises equipment 240 in the VLAN, the first provider edge node 300 would broadcast a message from the first customer premises 210 to all provider edge nodes. Third customer premises equipment 240 would answer through PE2 310. After receiving a response from third customer premises equipment 240, first provider edge 300 would save a MAC address entry in the MAC address table having a mapping value designating the first tunnel 290 as the way to access third customer premises equipment 240 through PE2 310. Once first provider edge node 300 has the MAC address mapping value for third customer premises equipment 240 designating the first tunnel 290 in first provider edge node's 300 MAC address table, any traffic thereafter destined for third customer premises equipment 240 through first provider edge node 300, would be unicast through the first tunnel 290 thereby reducing network traffic on tunnels which are not needed and saving network resources. Concurrently, the second provider edge node 310 would save the MAC address mapping value designating the first tunnel 290 as the way to access first customer premises equipment 210 through the first provider edge node 300. For service between first customer premises equipment 210 and fifth customer premises equipment 260, the first provider edge node 300 would broadcast a message from the first customer premises equipment 210 to all other provider edge nodes to reach fifth customer premises equipment 260 which would answer through the third provider edge node 320. The first provider edge node 300 would learn the MAC address mapping value designating the third tunnel 294 as the way to access fifth customer premises equipment 260 through the third provider edge node 320, while concurrently the third provider edge node 320 would learn the MAC address mapping value designating the third tunnel 294 as the way to access first customer premises equipment 210 through the first provider edge 300. In general, provider edge nodes learn the proper tunnel to destination customer premises equipment from a response to a broadcast or by receiving traffic from the customer premises equipment. This tunnel to the destination is kept as a MAC address mapping value in its MAC address table, and will be used to unicast any further traffic directly to that destination customer premises equipment.

In providing communications services to customers, service providers attempt to ensure that services are delivered without loss of data and with minimal interruption. This applies especially to the links between the provider edge nodes on the edge of a VPLS network, and the access equipment immediately down/up stream of the provider edge node towards customer premises equipment. A well known approach to ensuring data transfer services is automatic protection switching or APS. In SONET/SDH, APS 1+1 is typically used for single chassis protection switching.

Referring now to FIG. 2A, known single chassis APS 1+1 is discussed. A near end (NE) chassis 10 having SONET line-terminating equipment (LTE) whose data traffic is to be protected, has an NE working port 21 which is linked via a bi-directional working link 14 to a far end (FE) working port 23 of an FE chassis 20 having SONET LTE. The NE chassis 10 is also linked from an NE protection port 25 over a bi-directional protection link 16 to an FE protection port 27 of the FE chassis 20. In this configuration, the NE chassis 10 is said to be protected by an APS group having a working circuit made up of the NE working port 21, the working link 14, and the FE working port 23, and having a protection circuit made up of the NE protection port 25, the protection link 16, and the FE protection port 27.

Typically the working circuit carries the data traffic which is to be protected. When a circuit is carrying the data traffic, it is said to be active, and when it is not carrying the traffic it is said to be inactive. For consistency the link and ports of an active circuit are referred to as being active, and the link and ports of an inactive circuit are referred to as being inactive. In automatic protection switching the working circuit is typically active when there is no failure.

In the event of a failure or degradation of the signal of the active circuit, which may be caused by failure or degradation of the active link or either active ports, APS 1+1 switches the data traffic from traversing the failed or degraded circuit to traversing the other circuit. The other circuit becomes active and the failed or degraded circuit becomes the inactive circuit. Since each single chassis has control of a working port and a protection port, it is not difficult to switch the data traffic from the working circuit to the protection circuit.

In the context of VPLS as illustrated in FIG. 1, the access link 280 could be an APS 1+1 single chassis redundant link between the access switch 202 and the first provider edge node 300. In other words the access switch 202 of FIG. 1 would operate as the near end chassis 10 of FIG. 2A, the access link 280 would be made up of a working link and a protection link similar to those 14, 16 depicted in FIG. 2A. Finally, the first provider edge node 300 of FIG. 1 would operate as the far end chassis 20 of FIG. 2A.

The APS 1+1 architecture also allows for the protection circuit and the working circuit to be configured to end at two different FE chassis. Such a known configuration protects against nodal or router failures in addition to link and circuit failures.

Referring to FIG. 2B, a known dual chassis APS 1+1 configuration is discussed. A near end (NE) chassis 110 having SONET line-terminating equipment (LTE) whose data traffic is to be protected, has an NE working port 153 which is linked via a bi-directional working link 114 to a far end (FE) working port 157 of a first FE chassis 120 (labeled "CHASSIS A" in FIG. 2B) having SONET LTE. The NE chassis 110 is also linked from an NE protection port 155 over a bi-directional protection link 116 to an FE protection port 159 of a second FE chassis 130 (labeled "CHASSIS B" in FIG. 2B) having SONET LTE. The first and second FE chassis 120, 130 are linked together via control link 140.

In this configuration, the NE chassis is protected by the APS group having a working circuit made up of the NE working port 153, the working link 114, and the FE working port 157, and having a protection circuit made up of the NE protection port 155, the protection link 116, and the FE protection port 159.

The second FE chassis 130 is referred to as the protection chassis or chassis in protection mode, and it is in constant communication with the first FE chassis 120 which is referred to as the working chassis or chassis in working mode.

In the event of a failure or degradation of the signal of the active circuit, which may be caused by failure or degradation of the active link, either active ports, or the working chassis, APS 1+1 switches the data traffic from traversing the failed or degraded circuit to traversing the other circuit. Since the FE chassis 120, 130 are remote from each other, FE chassis 120, 130 need to exchange switching control signals over the control link 140 to coordinate the switching from the working circuit to the protection circuit. FE chassis which exchange switching control signals over the control link 140 are said to be members of a redundant APS pair, each being an APS peer of the other within the pair. In switching the data traffic, the protection circuit becomes an active circuit and the failed or degraded working circuit becomes an inactive circuit.

In the context of VPLS, protection switching between the access switch 202 and the provider edge nodes 300, 310, 320, can be implemented using a multi-chassis APS configuration as discussed in association with FIG. 2B. In such a configuration, one provider edge node would act as a working chassis and another provider edge node would act as a protection chassis. After an APS switchover, however, other provider edge nodes will keep sending traffic to the de-activated provider edge node until they relearn the MAC address mappings of the customer premises equipment of the newly active provider edge node (previously the protection chassis). This causes black-holing of traffic for a time associated with layer 2 functionality such as hold times, time outs, or keep alive periods. This duration of black-holing is even worse if there is little or no traffic flowing from the new active provider edge node to the other provider edge nodes participating in the VPLS.

The manner in which the switching from the working circuit to the protection circuit is carried out and the particulars of how an APS configuration at the edge of a VPLS enabled network is used can have a very important effect on the resilience of the VPLS re-convergence and hence determine the duration and magnitude of the service interruption associated with black-holing.

SUMMARY OF THE INVENTION

According to one aspect the invention provides for a system of redundant pair automatic protection switching at the edge of a VPLS network comprising: a redundant pair of provider edge nodes comprising: a first provider edge node adapted to function as a working node of the redundant pair; and a second provider edge node adapted to function as a protection node of the redundant pair; wherein the first provider edge node is adapted to upon a switchover in the redundant pair: send an explicit request to a third provider edge node which possesses a MAC address entry that the third provider edge node previously learned from the first provider edge node to flush said MAC address entry.

In some embodiments of the invention the redundant pair of provider edge nodes are configured to be an APS 1+1 redundant pair.

Some embodiments of the invention further provide for an access switch linked to the first provider edge node over a working link and linked to the second provider edge node over a protection link; wherein the access switch forms a working circuit with the working link and the first provider edge node, and wherein the access switch forms a protection circuit with the protection link and the second provider edge node.

Some embodiments of the invention further provide for a first tunnel linking the first provider edge node with the third provider edge node; wherein the third provider edge node possesses a MAC address table containing said MAC address entry, said wherein said MAC address entry identifies the first tunnel.

Some embodiments of the invention further provide for an access switch linked to the first provider edge node over a working link and linked to the second provider edge node over a protection link; a first customer premises equipment site linked to said access switch; and a first tunnel linking the first provider edge node with the third provider edge node; wherein the redundant pair of provider edge nodes are configured to be an APS 1+1 redundant pair; wherein the access switch forms a working circuit with the working link and the first provider edge node, and wherein the access switch forms a protection circuit with the protection link and the second provider edge node; and wherein the third provider edge node possesses a MAC address table containing said MAC address entry, said wherein said MAC address entry identifies the first tunnel as an access tunnel to the first customer premises equipment site.

According to another aspect, the invention provides for a method of redundant pair automatic protection switching at the edge of a VPLS network comprising: sending from a first provider edge node adapted to function as a working node of a redundant pair of provider edge nodes, upon a switchover in the redundant pair, an explicit request to a third provider edge node to flush a first MAC address entry for a first customer premises equipment that the third provider edge node previously learned from the first provider edge node.

Some embodiments of the invention further provide for flushing the first MAC address entry from the third provider edge node.

Some embodiments of the invention further provide for receiving at a second provider edge node adapted to function as a protection node of the redundant pair of provider edge nodes, customer traffic from said first customer premises equipment; forwarding said customer traffic from said second provider edge node to said third provider edge node; and learning at said third provider edge node a new MAC address entry for said first customer premises equipment to replace said first MAC address entry.

BRIEF DESCRIPTION OF THE DRAWINGS

The features and advantages of the invention will become more apparent from the following detailed description of the preferred embodiment(s) with reference to the attached figures, wherein.

It is noted that in the attached figures, like features bear similar labels.

DETAILED DESCRIPTION OF THE PREFERRED EMBODIMENTS

The preferred embodiment provides multi-nodal (MN) APS 1+1 protection for access to a VPLS core network from a network element of an access cloud accessible by customer premises equipment which forms part of a VLAN. Since the APS mechanism is a layer 1 mechanism, knowledge of a failure by the APS system occurs very quickly after the failure. Such a time scale can be very useful if the information of the failure and the state of the APS mechanism could be quickly integrated into the functioning of the VPLS network. The preferred embodiment capitalizes on that difference in time scale by using the timely APS reaction to a failure to invoke early initiation of re-convergence of the VPLS provider edge nodes.

Figure 1:
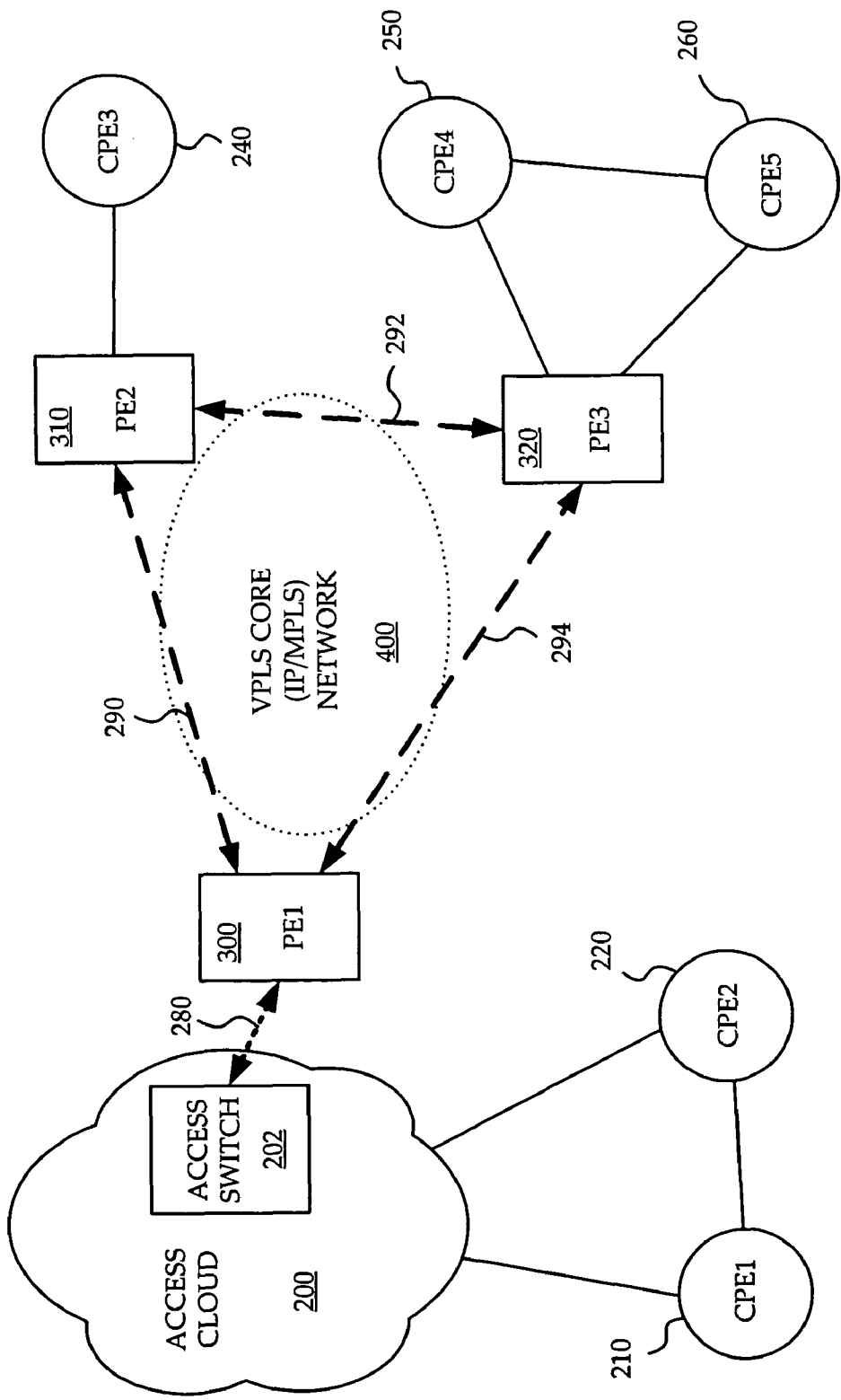
FIG. 1 is a block diagram of a known system for providing VPLS to a number of customer premise equipment sites.
Figure 2A:
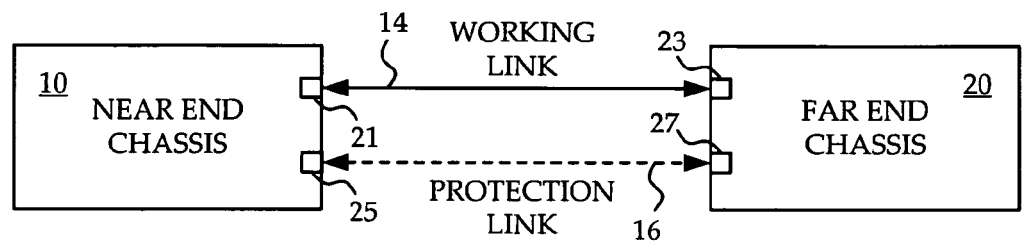
FIG. 2A is a block diagram of a known APS 1+1 single chassis configuration.
Figure 2B:
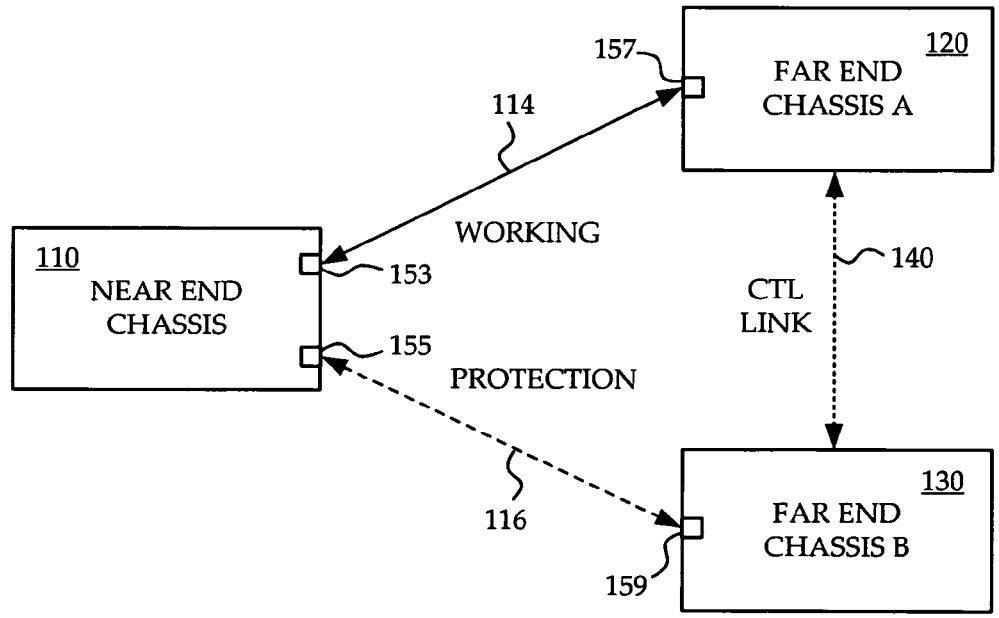
FIG. 2B is a block diagram of a known APS 1+1 dual chassis configuration.
Figure 3:
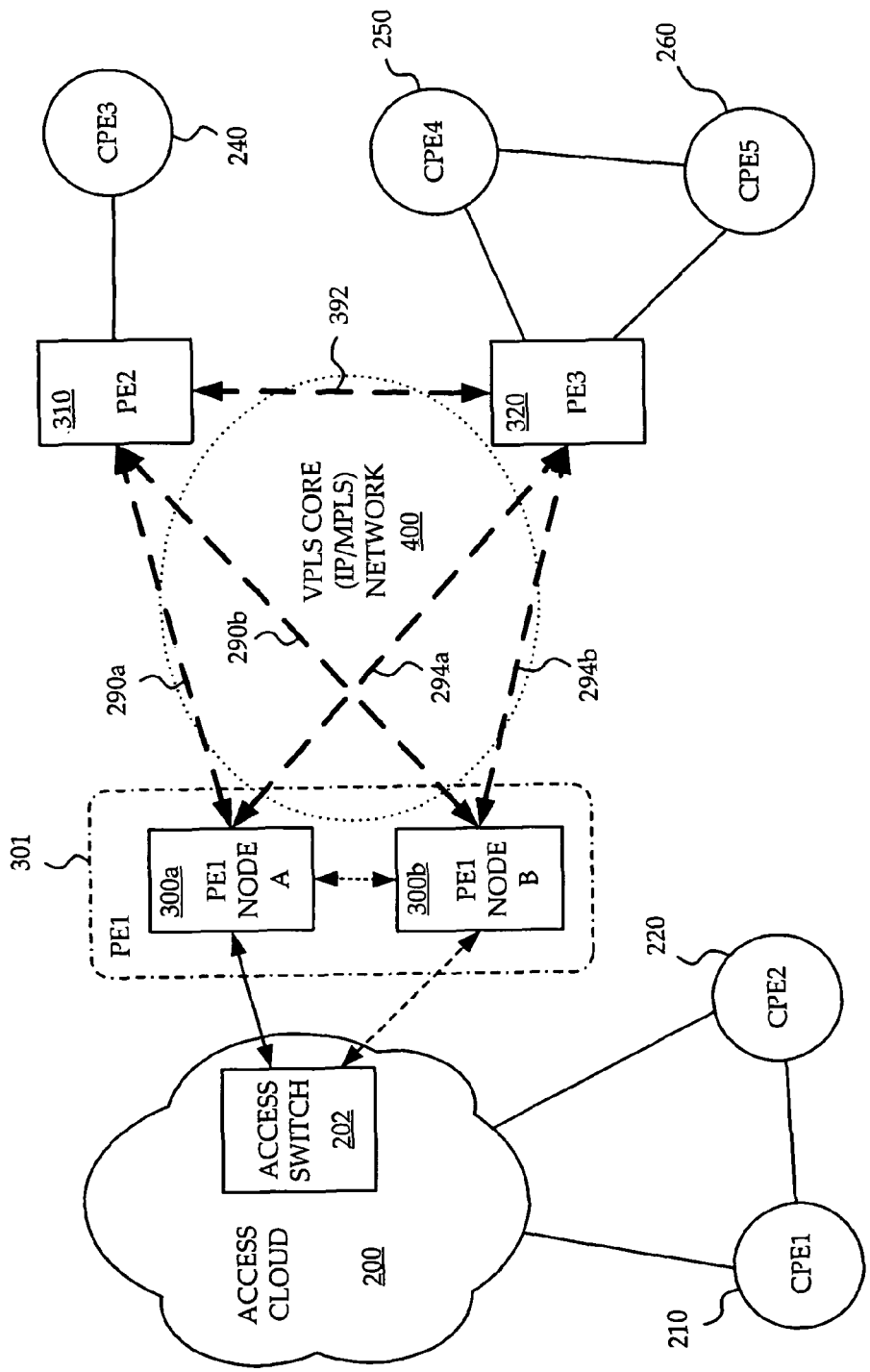
FIG. 3 is a block diagram of a system for VPLS having multi-nodal APS 1+1 configuration between the access cloud and the provider edge nodes according to a preferred embodiment of the invention.

Referring to FIG. 3, an example configuration according to a preferred embodiment of the invention of MN-APS 1+1 protection of access to provider edge nodes of a network providing VPLS is discussed in terms of structure.

First customer premises equipment (CPE1) 210 and second customer premises equipment (CPE2) 220 are connected to an access cloud 200 which lies outside of the VPLS core IP/MPLS network 400 of the service provider. Access cloud 200 has an access switch 202. The access cloud 200 and switch 202 may for example be ATM/SONET/SDH/frame relay, as long as access to the provider edge nodes of the VPLS network 400 is provided. The access switch 202 is linked to a redundant pair of provider edge nodes (labeled PE1 in FIG. 3) 301 in an MN-APS 1+1 configuration as discussed above. The redundant pair of nodes includes one redundant provider edge node PE1 NODE A 300a, which is active and hence acting as the working node of the pair, and another redundant provider edge node PE1 NODE B 300b which is inactive and hence acting as the protection node of the pair. The one redundant provider edge node 300a will also be referred to as the working provider edge node 300a, while the other provider edge node 300b will also be referred to as the protection provider edge node 300b. The second provider edge node (PE2) 310 has two tunnels linking it with the redundant pair 301. Specifically the second provider edge node 310 is linked via a first tunnel 290a to the working provider edge node 300a, and is linked via a second tunnel 290b to the protection provider edge node 300b. The third provider edge node (PE3) 320 also has two tunnels linking it with the redundant pair 301. The third provider edge node 320 is linked via a third tunnel 294a to the working node 300a, and via a fourth tunnel 294b to the protection node 300b. The second provider edge node 310 and the third provider edge node 320 are linked via a fifth tunnel 392. Fourth customer premises equipment 250 and fifth customer premises equipment 260 are linked to the third provider edge node 320 and third customer premises equipment 240 is linked to the second provider edge node 310.

Referring to FIG. 3, the example configuration according to a preferred embodiment of the invention of MN-APS 1+1 protection of access to provider edge nodes of a network providing VPLS is discussed in terms of function.

In the VPLS core 400, the provider edge nodes 300a, 300b, 310, 320, learn MAC address mapping values with the customer traffic sent through access ports and over the IP/MPLS network. As discussed above customer traffic having a destination customer premises equipment which has an unmapped MAC address at the originating provider edge node is broadcast to all other provider edge nodes participating in delivery of the VPLS. MAC address mapping values designating tunnels which allow VPLS delivery to destination customer premises equipment are learned by the provider edge nodes by receiving traffic therefrom. Once the MAC address mapping values are learned customer traffic is sent unicast towards the destination customer premises equipment.

In the event of an APS failover at the redundant node pair 301, after the working node 300a becomes inactive, and the protection node 300b becomes active, the first and third tunnels 290a, 294a, become invalid while second and fourth tunnels 290b and 294b become valid. According to the preferred embodiment the APS failover triggers flushing of MAC address entries in MAC address tables of the second and third provider edge nodes 310, 320 of previously valid tunnels learned from the previously active working node 300a. This is preferably achieved by transmission of explicit requests from the previously active working node 300a to the second and third provider edge nodes 310, 320 to flush the MAC address entries learned via the previously active working node 300a. This flushing means that when there is subsequent traffic between first customer premises equipment 210 or second customer premises equipment 220 and the second or third provider edge nodes 310, 320 a new broadcast from the second or third provider edge nodes 310, 320 and hence learning of new MAC address mapping values is triggered. Since the APS switchover is a relatively fast process, sending the explicit request from the previously active node 300a to flush MAC address entries learned through it causes a much quicker re-convergence than otherwise possible.

For example, suppose third customer premises equipment 240 and first customer premises equipment 210 were exchanging traffic, and that fourth customer premises equipment 250 and second customer premises equipment 220 were recently exchanging traffic but are not exchanging traffic during a first period of time. During this first period of time the second provider edge node 310 would have a MAC address table indicating the first tunnel 290a is the route to first customer premises equipment 210 which it would have learned earlier through broadcast and standard MAC address mapping value learning. Similarly, although fourth customer premises equipment 250 and second customer premises equipment 220 are not exchanging traffic during the first time period, the third provider edge node 320 will have a MAC address mapping value for access to second customer premises equipment 220 designating the third tunnel 294a. Upon an APS switchover, the working node 300a becomes inactive, while the protection node 300b becomes active. The working node 300a sends an explicit request to the second provider edge node 310 to flush its MAC address entries learned through the working node 300a, which in this case is the MAC address entry associated with access to first customer premises equipment 210 designating the first tunnel 290a. The working node 300a also sends a similar explicit request to the third provider edge node 320 to flush its MAC address entries learned through the working node 300a, which in this case is the MAC address entry associated with access to second customer premises equipment 220 designating the third tunnel 294a. According to the preferred embodiment both the second and third provider edge nodes 310, 320 flush the MAC address entries requested to be so flushed by the previously active working node 300a. Since third customer premises equipment 240 is exchanging traffic with first customer premises equipment 210 during the first time period, flushing of the MAC address entry at the second provider edge node 310 causes traffic from the second provider edge node 310 destined for first customer premises equipment 210 to be broadcast to all the other provider edge nodes in the VPLS. First customer premises equipment would reply through the now active protection node 300b over the second tunnel 290b and the second provider edge node 310 would learn and store the MAC address mapping value designating the second tunnel 290b as the access to first customer premises equipment 210 in a MAC address entry in its MAC address table. Data transmissions between first customer premises equipment 210 and third customer premises equipment 240 would quickly begin to be exchanged over the second tunnel 290b. In respect of the third provider edge node 320, after flushing its MAC address entry designating the third tunnel 294a as access to second customer premises equipment 220, it would not have an entry in its MAC address table for access to second customer premises equipment 220. Once transmissions between second customer premises equipment 220 and fourth customer premises equipment 250 commence, broadcast and relearning of the new MAC address mapping value designating the fourth tunnel 294b as the access tunnel between the now active protection node 300b and the fourth customer premises equipment 250 quickly occurs, at which point the appropriate MAC address entry would be stored in the MAC address table of the third provider edge node 320.

In the event that the working node 300a of a redundant pair 301 goes down, the other provider edge nodes participating in the VPLS would register that the associated tunnels 290a, 290b are actually down and would flush the MAC address entries learned through the now down tunnels 290a, 290b.

The preferred embodiment provides a mechanism to integrate the fast response time of the layer 1 APS mechanism into the functioning of the VPLS network. The benefit of redundancy is provided while at the same time, relearning of MAC address mapping values, and avoidance of black holing is facilitated through the explicit request made by the previously active node of the redundant pair. The resulting benefits are quicker re-convergence of VPLS and reduction of the duration of an interruption caused by black-holing.

It should be noted that although in preferred embodiment only one redundant pair of provider edge nodes was depicted, in general any number of APS configured redundant pairs may be used for access to the VPLS network.

Although the preferred embodiment utilizes an MN-APS 1+1 redundant pair at the edge of the VPLS network, other kinds of redundant automatic protection switching could be used as long as the previously active node sends the explicit request for MAC address entry flushing.

The embodiments presented are exemplary only and persons skilled in the art would appreciate that variations to the embodiments described above may be made without departing from the spirit of the invention. The scope of the invention is solely defined by the appended claims.

We claim:

1. A system of redundant pair automatic protection switching at the edge of a Virtual Private LAN System (VPLS) network comprising a redundant pair of provider edge nodes comprising:
   a first provider edge node that is a working node of the redundant pair before a switchover and a protection node of the redundant pair after the switchover, and
   a second provider edge node that is the protection node of the redundant pair before the switchover and the working node of the redundant pair after the switchover; and
   a third provider edge node possessing a media access control (MAC) address entry for the first provider edge node, previously learned by the third provider edge node, wherein the first provider edge node, when functioning as the working node, communicates with the third provider edge node, and, after the switchover in the redundant pair, sends an explicit request to the third provider edge node to flush said MAC address entry for the first provider edge node.

2. The system of claim 1, wherein the redundant pair of provider edge nodes is an Automatic Protection Switching (APS) 1+1 redundant pair.

3. The system of claim 1, further comprising:
an access switch linked to the first provider edge node over a working link and linked to the second provider edge node over a protection link, wherein the access switch forms a working circuit with the working link and the first provider edge node, and a protection circuit with the protection link and the second provider edge node.

4. The system of claim 1, further comprising:
a first tunnel linking the first provider edge node with the third provider edge node, wherein the third provider edge node possesses a MAC address table containing said MAC address entry, and said MAC address entry identifies the first tunnel.

5. The system of claim 4, further comprising:
a second tunnel linking the second provider edge node with the third provider edge node, wherein the first tunnel becomes invalid after the switchover and the second tunnel becomes valid after the switchover.

6. The system of claim 1, further comprising:
an access switch linked to the first provider edge node over a working link and linked to the second provider edge node over a protection link;
a first customer premises equipment site linked to said access switch; and
a first tunnel linking the first provider edge node with the third provider edge node, wherein the redundant pair of provider edge nodes is an Automatic Protection Switching (APS) 1+1 redundant pair, the access switch forms a working circuit with the working link and the first provider edge node and a protection circuit with the protection link and the second provider edge node, the third provider edge node possesses a MAC address table containing said MAC address entry, and the MAC address entry identifies the first tunnel as an access tunnel to the first customer premises equipment site.

7. The system of claim 1, further comprising:
a fourth provider edge node, possessing a MAC address for the second provider edge node, previously learned by the fourth provider edge node.

8. The system of claim 7, wherein the first provider edge node, when functioning as the working node, communicates with the fourth provider edge node, and, after the switchover in the redundant pair, sends an explicit request to the fourth provider edge node to flush the MAC address for the second provider edge node.

9. The system of claim 7, further comprising:
a tunnel between the third provider edge node and the fourth provider edge node.

10. The system of claim 7, wherein both the third provider edge node and the fourth provider edge node flush MAC address entries.

11. The system of claim 1, further comprising:
a first tunnel linking the first provider edge node with the third provider edge node, wherein the third provider edge node possesses a MAC address table containing said MAC address entry, and the MAC address entry identifies the first tunnel as an access tunnel to the first customer premises equipment site.

12. A method of redundant pair automatic protection switching at the edge of a Virtual Private LAN System (VPLS) network, the method comprising:
providing a redundant pair of provider edge nodes, the redundant pair of provider edge nodes comprising a first provider edge node that is a working node of the redundant pair before a switchover and a protection node of the redundant pair after the switchover, and a second provider edge node that is the protection node of the redundant pair before the switchover and the working node of the redundant pair after the switchover;
providing a first customer premises equipment connected to the redundant pair of provider edge nodes;
providing a third provider edge node;
communicating between the first provider edge node functioning as the working mode and the third provider edge node;
learning, with the third provider edge node, a first media access control (MAC) address for the first customer premises equipment, based on said communicating;
detecting the switchover in the redundant pair; and
in response to the switchover, sending from the first provider edge node an explicit request to the third provider edge node to flush said first MAC address.

13. The method of claim 12, further comprising:
flushing the first MAC address entry from the third provider edge node.

14. The method of claim 13, further comprising:
adapting the second provider edge node to function as the working node of the redundant pair of provider edge nodes;
receiving, at the second provider edge node, customer traffic from said first customer premises equipment;
forwarding said customer traffic from said second provider edge node to said third provider edge node; and
learning, at said third provider edge node, a new MAC address entry for said first customer premises equipment to replace said first MAC address entry.

15. The method of claim 13, further comprising:
learning, at said third provider edge node, a new MAC address entry for said first customer premises equipment to replace said first MAC address entry.

16. The method of claim 12, further comprising:
after the switchover, making a first tunnel between the first provider edge node and the third provider edge node invalid.

17. The method of claim 16, further comprising:
after the switchover, making a second tunnel between the second provider edge node and the third provider edge node valid.

18. The method of claim 12, further comprising:
providing a fourth provider edge node;
communicating between the first provider edge node that is functioning as the working mode and the fourth provider edge node;
learning, with the fourth provider edge node, a second MAC address for a second customer premises equipment.

19. The method of claim 18, further comprising:
in response to the switchover, sending from the first provider edge node an explicit request to the fourth provider edge node to flush the second MAC address.

20. The method of claim 12, further comprising:
learning, with a fourth provider edge node, a second MAC address for a second customer premises equipment.

* * * * *